(No Model.)
C. ZITKO.
RAIN WATER CUT-OFF.
No. 337,805. Patented Mar. 9, 1886.
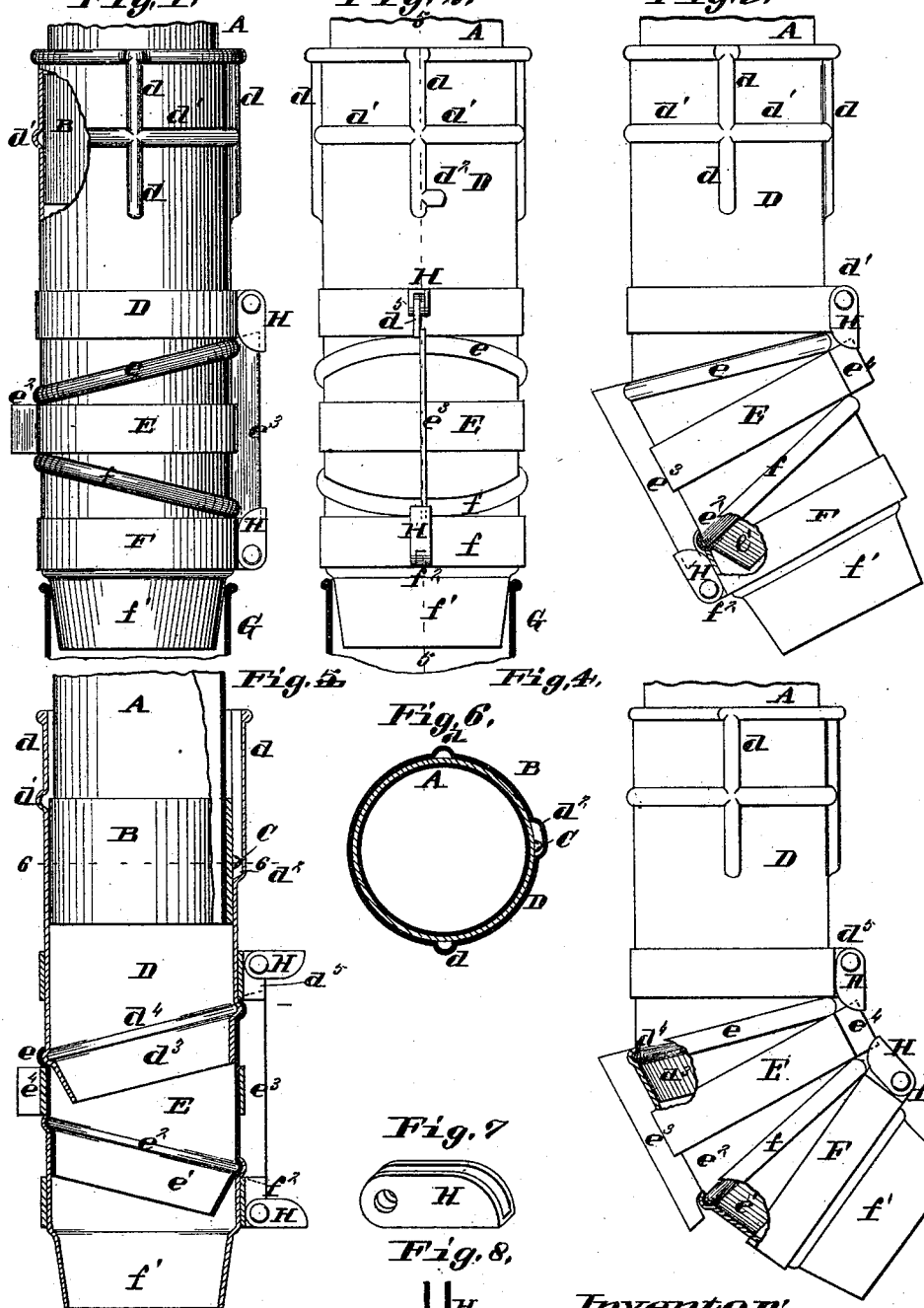

UNITED STATES PATENT OFFICE.

CHARLES ZITKO, OF ST. LOUIS, MISSOURI.

RAIN-WATER CUT-OFF.

SPECIFICATION forming part of Letters Patent No. 337,805, dated March 9, 1886.

Application filed June 22, 1885. Serial No. 169,469. (No model.)

*To all whom it may concern:*

Be it known that I, CHARLES ZITKO, of the city of St. Louis, in the State of Missouri, have invented a certain new and useful Improvement in Rain-Water Cut-Offs, of which the following is a full, clear, and exact description, reference being had to the accompanying drawings, forming part of this specification.

My invention relates to that class of pipes which are made up of a number of cylindrical sections, each cut off at one or both ends obliquely to its axis, the adjacent sections being joined together by corresponding ribs and grooves formed upon the meeting faces of the respective sections in such a manner that the pipe when completed will be universally adjustable.

My invention consists, first, in providing the lower extremity of each section with a nozzle, which projects into the next adjacent section, said nozzles being tapering or conical to permit the desired rotation of the sections; secondly, in providing the main section with a latch for engaging the rotary sections and holding them at any desired angle of inclination.

My invention consists, also, in certain other devices, hereinafter fully described, and particularly pointed out in the claims.

Figure 1 is a side view of the cut-off in its straight condition and in its lower position on the rain-pipe. Fig. 2 is a similar view to Fig. 1, but showing another side. Figs. 3 and 4 are side views showing, respectively, the cut-off partly and fully curved. Fig. 5 is a sectional view of the cut-off at 5 5, Fig. 2. Fig. 6 is a transverse section at 6 6, Fig. 5. Fig. 7 is an enlarged perspective view of one of the latches by which the parts are held in position, and Fig. 8 a transverse section of same.

The invention, while intended primarily for application to descending rain-pipes, may be used in other situations. It will be described as applied to this special use.

A is the part of the pipe to which the cut-off is connected. B is a collar upon the pipe, having upon it a stud, C. D is the upper member of the cut-off. This is made to slide easily on the collar B, and has grooves $d$ and $d'$ upon the inside to receive the stud C, the purpose of stud and grooves being to hold the cut-off in any position upon the pipe. To explain, the cut-off is slipped upon the collar, the stud C entering either of the vertical grooves $d$. When the stud is in line with the horizontal groove $d'$ or the short groove or offset $d^2$, the cut-off may be turned to cause the stud to enter the groove $d'$ or $d^2$, and the cut-off is sustained upon the pipe A.

The lower end of the member D is made oblique, and has a tapering nozzle, $d^3$, at the base of which is an oblique circumferential rib, $d^4$, which is embraced by the lip $e$ at the upper end of the next section, E, of the cut-off. The section E is made oblique at both ends, the upper end having the oblique circumferential lip $e$, and the lower end having nozzle $e'$ and rib $e^2$, similar to those $d^3$ and $d^4$, and for a similar purpose, the rib $e^2$ being embraced by the lip $f$ of the lower section, F, of the cut-off. The section F is oblique at the upper end, like the section E, but its lower end is at right angles to the axis of the section.

$f'$ is a tapering nozzle forming the lower end of the section F, and fitted to enter the pipe G or other conveyer.

The section E turns on the section D and the section F on the section E, the lips $e$ and $f$ slipping upon the ribs $d^4$ and $e^2$. It will be seen that when the members E and F are in the position shown in Figs. 1, 2, and 3 they are in line with the pipes A and G.

It will of course be understood that the joints between the several sections must be sufficiently loose to permit them to turn one upon the other, and to make such joints water-tight would add too much to the cost of the pipe. To overcome this difficulty—*i. e.*, to prevent leakage at such joints, and at the same time keep the cost of manufacturing at a comparatively low figure—I employ the tapering nozzles projecting from one member into the next. The water being thereby carried beyond the joints, there will be no tendency to return, as the pipe always occupies a more or less upright position.

To prevent more than a semi-rotation of the members at either of the joints, ($d^4$ $e$ or $e^2$ $f$,) I have upon the section E ribs $e^3$ $e^4$, and upon the sections D and F projections $d^5$ and $f^2$, respectively, a half-turn of the member bringing these parts into contact.

To hold the sections in either position, a latch, H, is hinged to each of the projections $d^5$ and $f^2$, the latch being in transverse section of a flat U form, so that the latch embraces at the same time the projection and the rib $e^3$ or $e^4$, as the case may be.

I claim—

1. A pipe made up of a number of sections connected by oblique turn-joints, substantially as described, the lower extremity of each section being provided with a tapering or conical nozzle extending from said joint into the next adjacent section, substantially as and for the purpose set forth.

2. The combination, with the sections of a pipe connected by turn-joints, of overlapping stops secured to said sections for limiting the rotation of one section upon the other, as explained.

3. The combination of sections of a water cut-off connected by oblique turn-joint, stops upon the sections limiting the turning movement of one section upon another, and hinged latch locking the stops together, for the purpose set forth.

CHARLES ZITKO.

Witnesses:
SAML. KNIGHT,
BENJN. A. KNIGHT.